(12) United States Patent
Smith et al.

(10) Patent No.: US 8,929,391 B2
(45) Date of Patent: Jan. 6, 2015

(54) SYSTEMS AND METHODS FOR COMMUNICATIONS DEVICES HAVING MULTIPLE INTERFACES

(75) Inventors: Rhett Smith, Moscow, ID (US); Ryan Bradetich, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 635 days.

(21) Appl. No.: 13/166,637

(22) Filed: Jun. 22, 2011

(65) Prior Publication Data
US 2012/0331082 A1   Dec. 27, 2012

(51) Int. Cl.
*H04J 3/16*    (2006.01)
*H04L 12/931*  (2013.01)

(52) U.S. Cl.
CPC ............ *H04L 49/602* (2013.01); *H04L 49/351* (2013.01)
USPC ........................................................ 370/466

(58) Field of Classification Search
CPC ................................ H04L 69/08; H04L 69/18
See application file for complete search history.

(56) References Cited

U.S. PATENT DOCUMENTS

| | | |
|---|---|---|
| 4,972,290 A | 11/1990 | Sun |
| 5,160,926 A | 11/1992 | Schweitzer |
| 5,210,875 A | 5/1993 | Bealkowski |
| 5,224,011 A | 6/1993 | Yalla |
| 5,289,468 A | 2/1994 | Yoshida |
| 5,428,553 A | 6/1995 | Chiba |
| 5,680,324 A | 10/1997 | Schweitzer |
| 6,259,706 B1 | 7/2001 | Shimada |
| 6,542,464 B1 | 4/2003 | Takeda |
| 6,694,371 B1 * | 2/2004 | Sanai ............................ 709/230 |
| 7,304,586 B2 | 12/2007 | Wang |
| 7,426,694 B2 | 9/2008 | Gross |
| 7,460,536 B1 | 12/2008 | Williams |
| 7,599,748 B2 | 10/2009 | Dove |
| 7,639,699 B2 | 12/2009 | Tallet |
| 7,720,095 B2 | 5/2010 | Desai |
| 7,818,582 B2 | 10/2010 | Marion |
| 7,843,897 B2 | 11/2010 | Casebolt |
| 7,895,644 B1 | 2/2011 | Thakur |
| 2003/0147420 A1 | 8/2003 | Beckwith |
| 2004/0028033 A1 | 2/2004 | Koistinen |

(Continued)

OTHER PUBLICATIONS

Vuppala. "Virtual Network Ports" [online]. Dated 2002. Retrieved on Aug. 14, 2012. URL:<http://citeseerx.ist.psu.edu/viewdoc/download?doi=10.1.1.95.7679&rep=rep1&type=pdf>.

(Continued)

*Primary Examiner* — Chirag Shah
*Assistant Examiner* — Jenkey Van
(74) *Attorney, Agent, or Firm* — Jared L. Cherry; Richard M. Edge

(57) ABSTRACT

According to various embodiments, a communication switch may create and/or manage a variety of configurable network relationships between intelligent electronic devices (IEDs) connected via disparate network interfaces using a variety of communication protocols. Accordingly, a communication switch may provide media translation between various types of physical network ports and communication protocol conversion between various communication protocols. For example, a communication switch may be used to create a networked group of IEDs in which some IEDs are connected via Ethernet ports and other IEDs are connected via D-subminiature ports and/or optical ports. The communication switch may create and/or manage network relationships such as publisher/subscriber, master/slave, multidrop configurations, star configurations, and/or other complex network relationships between two or more IEDs or groups of IEDs.

16 Claims, 11 Drawing Sheets

(56) References Cited

U.S. PATENT DOCUMENTS

| | | |
|---|---|---|
| 2004/0073788 A1 | 4/2004 | Kim |
| 2004/0138786 A1 | 7/2004 | Blackett |
| 2005/0047407 A1* | 3/2005 | Desai et al. ............ 370/389 |
| 2005/0182979 A1 | 8/2005 | Gross |
| 2006/0077999 A1 | 4/2006 | Kagan |
| 2006/0083260 A1 | 4/2006 | Wang |
| 2006/0140146 A1 | 6/2006 | Funk |
| 2006/0170409 A1 | 8/2006 | Kagan |
| 2006/0198389 A1* | 9/2006 | Eriokson et al. ........ 370/466 |
| 2006/0238932 A1 | 10/2006 | Westbrock |
| 2007/0147415 A1* | 6/2007 | Marusca et al. ........ 370/465 |
| 2009/0265124 A1 | 10/2009 | Kagan |
| 2009/0300165 A1* | 12/2009 | Tuckey et al. .......... 709/224 |
| 2010/0002879 A1 | 1/2010 | Risley |
| 2010/0020724 A1* | 1/2010 | Wimmer et al. ........ 370/254 |
| 2010/0046545 A1 | 2/2010 | Kagan |
| 2010/0180338 A1 | 7/2010 | Stewart |
| 2010/0325687 A1 | 12/2010 | Iverson |

OTHER PUBLICATIONS

PCT/US2012/043599 Patent Cooperation Treaty, International Search Report and Written Opinion of the International Searching Authority, Aug. 27, 2012.

EtherPoll, Jan. 27, 2004.

John A. Kinast, AGA, 12 part 2 draft, American Gas Association, Jan. 23, 2006.

* cited by examiner

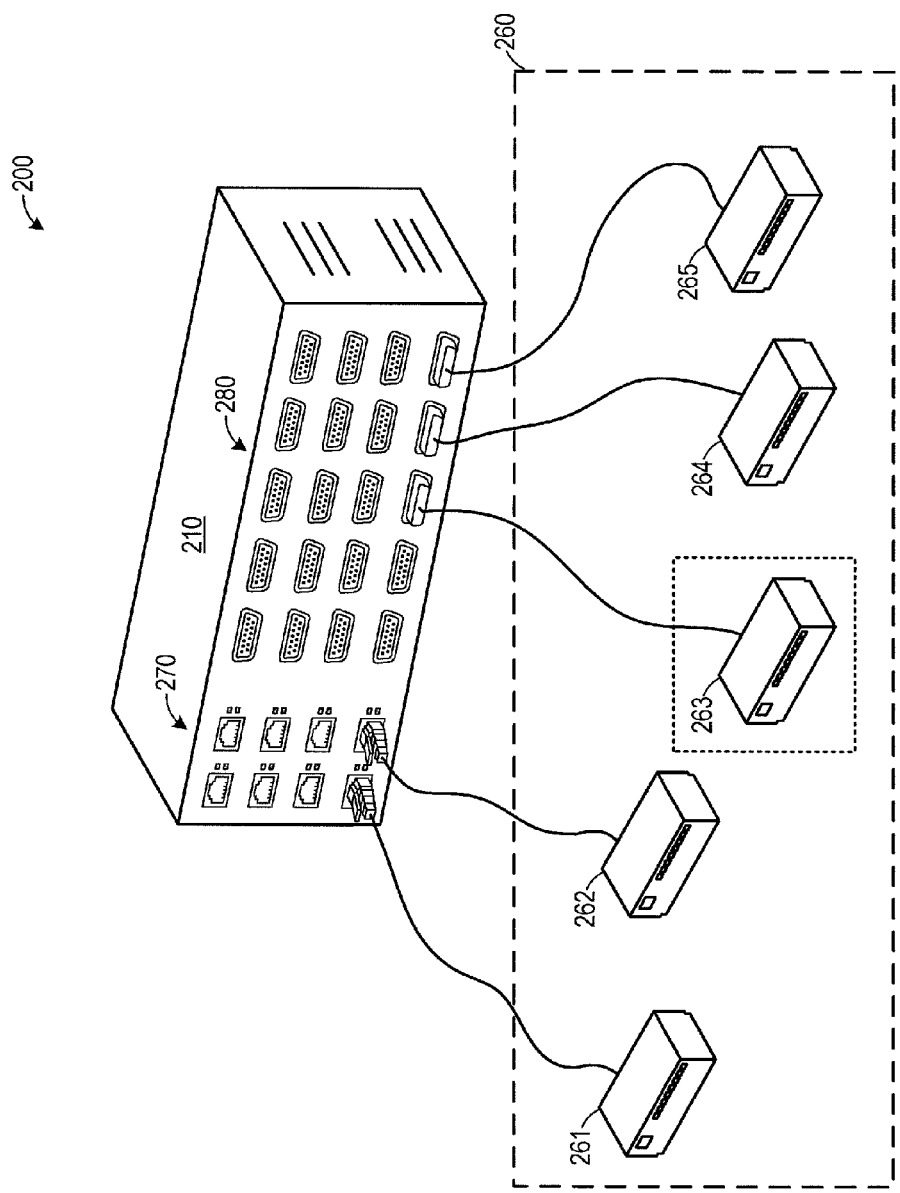

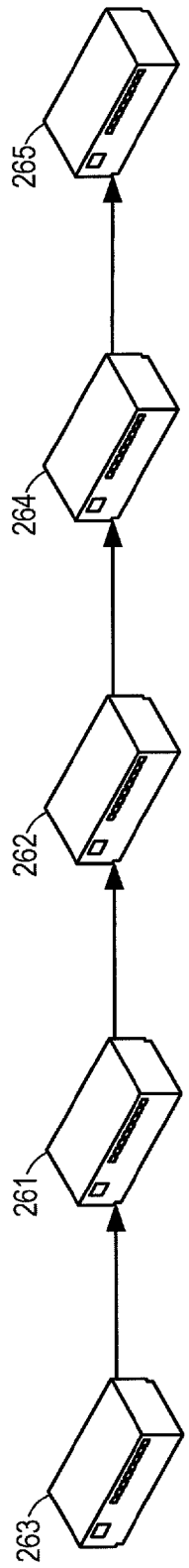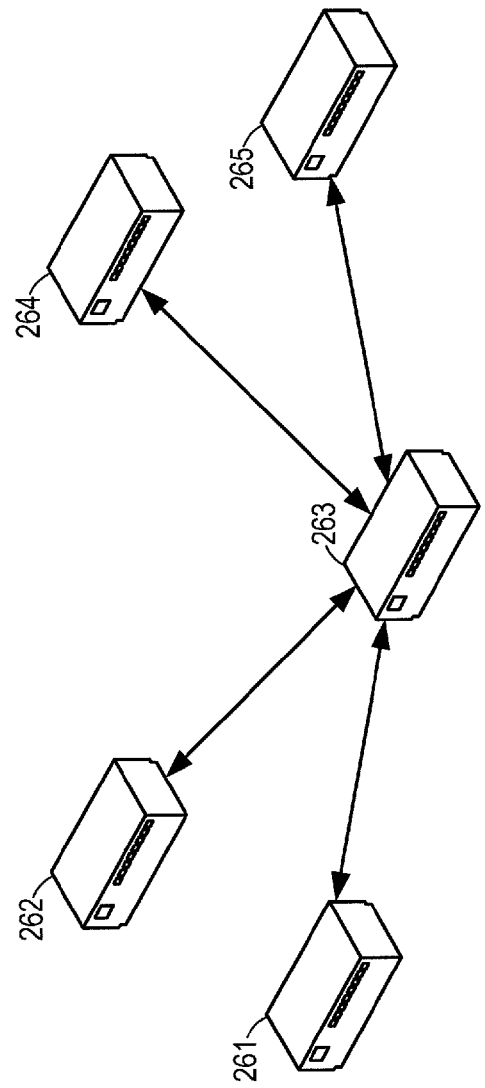
FIG. 2B
FIG. 2C

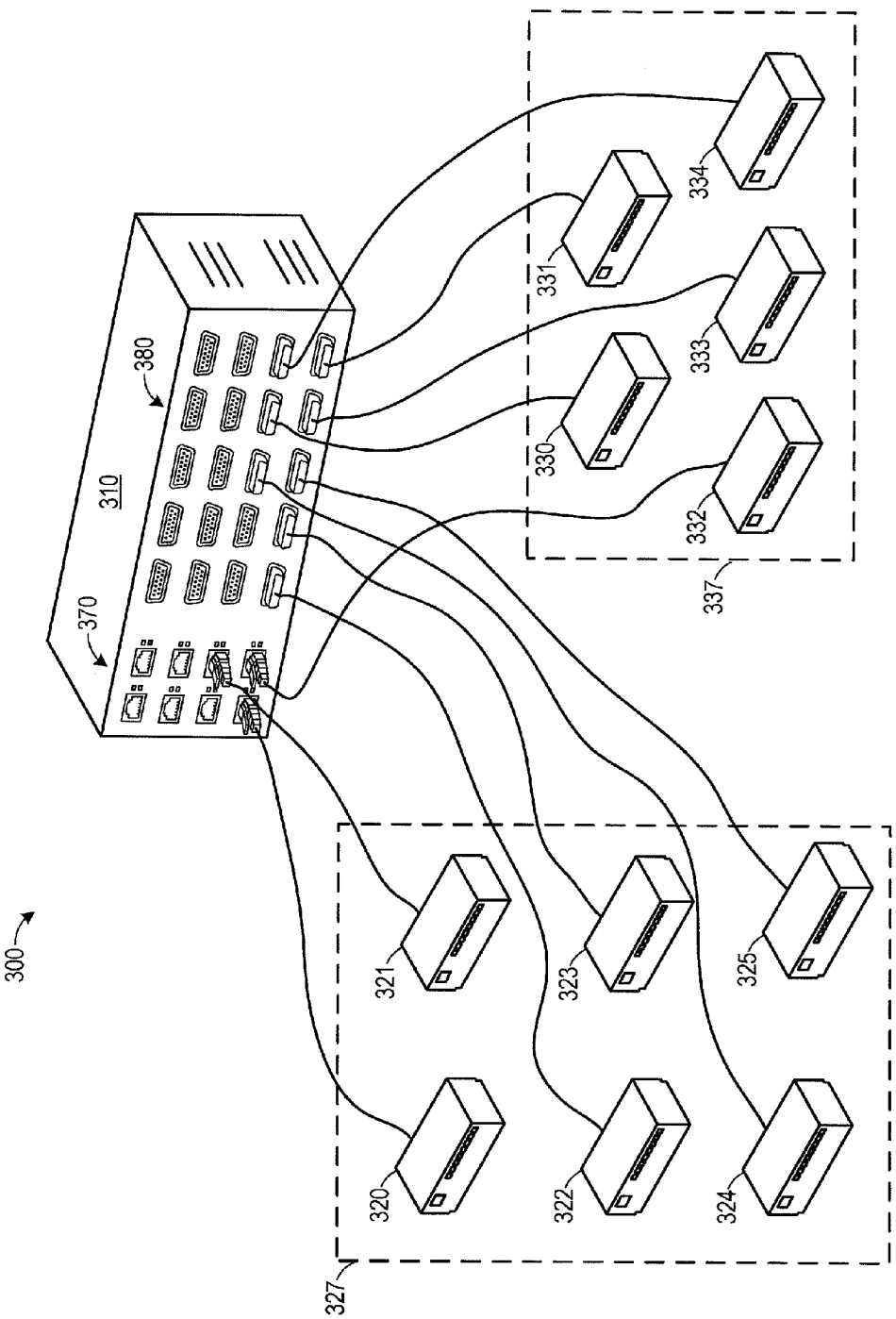

SYSTEMS AND METHODS FOR COMMUNICATIONS DEVICES HAVING MULTIPLE INTERFACES

BRIEF DESCRIPTION OF THE DRAWINGS

Non-limiting and non-exhaustive embodiments of the disclosure are described, including various embodiments of the disclosure with reference to the figures, in which:

FIG. 2A illustrates an embodiment of a plurality of IEDs connected to a communication switch via disparate network interfaces.

FIG. 2B illustrates a representative embodiment of a plurality of IEDs configured as a multidrop network.

FIG. 2C illustrates a representative embodiment of a plurality of IEDs configured in a server-client star configuration.

FIG. 3 illustrates an embodiment of a communication switch and a plurality of IEDs configured in two distinct groups.

Figure 1:
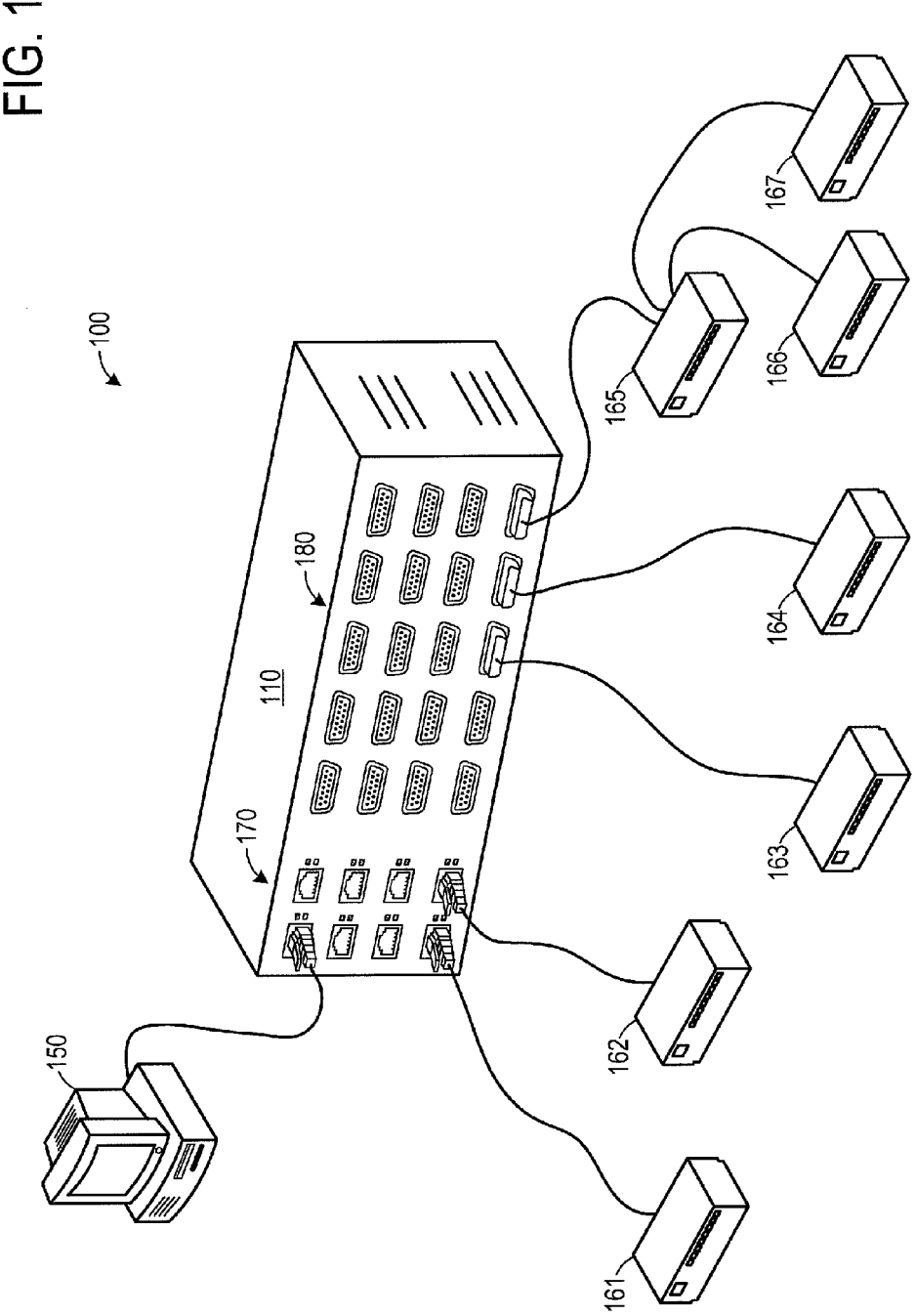
FIG. 1 illustrates an embodiment of a plurality of intelligent electronic devices (IEDs) connected to a communication switch via respective serial ports or Ethernet ports.

In the following description, numerous specific details are provided for a thorough understanding of the various embodiments disclosed herein. The systems and methods disclosed herein can be practiced without one or more of the specific details, or with other methods, components, materials, etc. In addition, in some cases, well-known structures, materials, or operations may not be shown or described in detail in order to avoid obscuring aspects of the disclosure. Furthermore, the described features, structures, or characteristics may be combined in any suitable manner in one or more alternative embodiments.

DETAILED DESCRIPTION

The present disclosure provides systems and methods for creating and managing a variety of configurable network relationships between intelligent electronic devices (IEDs) having disparate network interfaces. According to various embodiments, a communication switch supports a variety of physical network ports and associated communication protocols. For example, any of a variety of serial or parallel network ports may be used, including Ethernet ports, coaxial connections, various types of D-subminiature ports, optical ports, USB ports, IEEE 1394 ports, wireless network interfaces, modem ports, contact I/O ports, and the like.

According to one embodiment, a communication switch may be used to create and/or manage relationships between IEDs connected to the communication switch. A communication switch may create and manage a configurable network relationship between IEDs connected to the communication switch. For example, a communication switch may be used to create a networked group of IEDs, in which some IEDs in the group are connected via Ethernet and other IEDs in the group are connected via a serial port, such as DB9 or DB25.

A communication switch may be configured in some embodiments to manage a group of IEDs in a publisher/subscriber configuration. IEDs within the group may be configured to subscribe to the communications of other IEDs within the group. The communication switch may maintain a database including each IED and a list of other IEDs within the group that subscribe to that IED's transmission. Accordingly, when a given IED communicates data, the communication switch may determine which IEDs subscribe to the given IED and forward the transmitted data to each of the subscriber IEDs. As previously described, each subscriber IED may be connected via any of a variety of network interfaces, and the communication switch may perform the appropriate protocol conversion and media translation.

For example, an IED connected via Ethernet may transmit or publish data using Internet Protocol (IP). The communication switch may determine that a subscriber IED is connected via a 9-pin D-subminiature port utilizing the RS-232 standard. Accordingly, the communication switch performs the necessary protocol conversion between IP and RS-232 and the media translation between Ethernet and a 9-pin D-subminiature connection in order for the subscriber IED to receive the published data.

According to some embodiments, a group of IEDs may be created in which one of the IEDs is a master IED and other IEDs are slave IEDs. According to various embodiments, a master IED may provide proxy and authentication services to other IEDs within the group designated as slave devices. Additionally, the communication switch may allow the group of IEDs to communicate with one another as if they were connected in a multidrop communication bus or in a star configuration. In other words, while each IED in a group of IEDs may actually be directly connected to the communication switch, the communication switch may enable the IEDs in the group to communicate as if they were connected in series, a star configuration, a tree structure, or another arrangement.

A single communication switch may be utilized to create multiple distinct groups of IEDs. Alternatively, IEDs may be shared between two or more groups. IEDs may also be connected to the communication switch through a hub, a switch, a router, and/or another IED. Furthermore, a user may access a communication switch or a connected IED directly, through a user interface, through a connected user access device, and/or through one of the connected IEDs. According to various embodiments, the communication switch may include various authentication mechanisms to prevent unauthorized access to connected IEDs.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. In particular, an "embodiment" may be a system, an article of manufacture (such as a computer-readable storage medium), a method, and/or a product of a process.

The phrases "connected to" and "in communication with" refer to any form of interaction between two or more components, including mechanical, electrical, magnetic, and electromagnetic interaction. Two components may be connected to each other even though they are not in direct contact with each other and even though there may be intermediary devices between the two components.

As used herein, the term IED may refer to any microprocessor-based device that monitors, controls, automates, and/or protects monitored equipment within a system. Such devices may include, for example, remote terminal units, differential relays, distance relays, directional relays, feeder relays, overcurrent relays, voltage regulator controls, voltage relays, breaker failure relays, generator relays, motor relays, automation controllers, bay controllers, meters, recloser controls, communications processors, computing platforms, programmable logic controllers (PLCs), programmable automation controllers, input and output modules, motor drives, and the like. IEDs may be connected to a network, and communication on the network may be facilitated by networking devices including but not limited to multiplexers, routers, hubs, gateways, firewalls, and switches. Furthermore, networking and communication devices may be incorporated in an IED or be in communication with an IED. The term IED may be used interchangeably to describe an individual IED or a system comprising multiple IEDs.

Some of the infrastructure that can be used with embodiments disclosed herein is already available, such as: general-purpose computers, computer programming tools and techniques, digital storage media, and communications networks. A computer may include a processor such as a microprocessor, microcontroller, logic circuitry, or the like. The processor may include a special purpose processing device such as an ASIC, PAL, PLA, PLD, field programmable gate array (FPGA), or other customized or programmable device. The computer may also include a computer-readable storage device such as non-volatile memory, static RAM, dynamic RAM, ROM, CD-ROM, disk, tape, magnetic memory, optical memory, flash memory, or other computer-readable storage media.

Suitable networks for configuration and/or use as described herein include one or more local area networks, wide area networks, metropolitan area networks, and/or Internet or Internet protocol (IP) networks, such as the World Wide Web, a private Internet, a secure Internet, a value-added network, a virtual private network, an extranet, an intranet, or even standalone machines that communicate with other machines by physical transport of media. In particular, a suitable network may be formed from parts or entireties of two or more other networks, including networks using disparate hardware and network communication technologies. A network may incorporate landlines, wireless communication, and combinations thereof.

The network may include communications or networking software, such as software available from Novell, Microsoft, Artisoft, and other vendors, and may operate using TCP/IP, SPX, IPX, RS-232, and other protocols over twisted pair, coaxial, optical fiber cables, telephone lines, satellites, microwave relays, modulated AC power lines, physical media transfer, and/or other data transmission "wires" known to those of skill in the art. The network may encompass smaller networks and/or be connectable to other networks through a gateway or similar mechanism.

Aspects of certain embodiments described herein may be implemented as software modules or components. As used herein, a software module or component may include any type of computer instruction or computer executable code located within or on a computer-readable storage medium. A software module may, for instance, comprise one or more physical or logical blocks of computer instructions, which may be organized as a routine, program, object, component, data structure, etc., that perform one or more tasks or implement particular abstract data types.

In certain embodiments, a particular software module may comprise disparate instructions stored in different locations of a computer-readable storage medium, which together implement the described functionality of the module. Indeed, a module may comprise a single instruction or many instructions, and may be distributed over several different code segments, among different programs, and across several computer-readable storage media. Some embodiments may be practiced in a distributed computing environment where tasks are performed by a remote processing device linked through a communications network. In a distributed computing environment, software modules may be located in local and/or remote computer-readable storage media. In addition, data being tied or rendered together in a database record may be resident in the same computer-readable storage medium, or across several computer-readable storage media, and may be linked together in fields of a record in a database across a network.

The software modules described herein tangibly embody a program, functions, and/or instructions that are executable by computer(s) to perform tasks as described herein. Suitable software, as applicable, may be provided using the teachings presented herein and programming languages and tools, such as XML, Java, Pascal, C++, C, database languages, APIs, SDKs, assembly, firmware, microcode, and/or other languages and tools. Additionally, software, firmware, and hardware may be interchangeably used to implement a given function.

In some cases, well-known features, structures, or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations.

The embodiments of the disclosure will be best understood by reference to the drawings, wherein like parts are designated by like numerals throughout. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In other instances, well-known structures, materials, or operations are not shown or described in detail to avoid obscuring aspects of this disclosure. In addition, the steps of a method do not necessarily need to be executed in any specific order, or even sequentially, nor need the steps be executed only once, unless specifically stated.

FIG. 1 illustrates an embodiment of a system 100 including multiple intelligent electronic devices (IEDs) 161, 162, 163, 164, 165, 166, and 167 connected to a communication switch 110. As illustrated, communication switch 110 includes numerous network interfaces, including Ethernet ports 170 and serial ports 180. According to various embodiments, communication switch 110 may include additional network interfaces, such as any of parallel, serial, or wireless ports. IEDs may be connected to the communication switch 110 via any of a variety of physical network ports and may utilize any of a variety of communication protocols. As illustrated, IEDs 161 and 162 are connected to communication switch 110 via Ethernet ports 170 and IEDs 163-165 are connected to communication switch 110 via D-subminiature ports 180. IEDs 166 and 167 are connected to communication switch 110 via IED 165.

Access device 150 is connected to communication switch 110 through one of Ethernet ports 170. According to various embodiments, a user may communicate and/or control communication switch 110 and/or one of IEDs 161-167 via access device 150. According to various embodiments, communication switch 110 and/or IEDs 161-167 may include various authentication mechanisms to prevent unauthorized access. The particular Ethernet port to which access device 150 is connected may be referred to as an access device port. Any of Ethernet ports 170 and/or serial ports 180 may be configured as an access device port. According to certain embodiments, a firewall may be implemented between an access device port and other Ethernet ports 170 and/or serial ports 180. The firewall may be implemented using software and/or firmware in embodiments in which the access device port is configurable. In still other embodiments, certain ports may be specifically designed as access device ports. Where ports are specifically designed as access device ports, firewall features may be implemented using hardware and/or software.

According to various embodiments, each of IEDs 161-167 may communicate with one another through communication switch 110. Communication switch 110 may include an internal table indicating the IEDs with which each IED is allowed to communicate. Accordingly, while an operator may be required to provide login credentials in order to communicate with an IED via access device 150, an IED may be effectively pre-authorized to communicate with at least one other IED connected to communication switch 110.

According to various embodiments, communication switch 110 allows an IED connected via a first type of physical network port using a first communication protocol to communicate with IEDs connected via a second type of physical network port using a second communication protocol. For example, IED 161 may communicate with communication switch 110 using IP via an Ethernet port 170. IED 164 may communicate with communication switch 110 using RS-232 via a 9-pin D-subminiature port 180. In order for IED 161 to communicate with IED 164, communication switch 110 may perform a protocol conversion between IP and RS-232 and the media translation between Ethernet and a 9-pin D-subminiature connection. As such, communications between IEDs 161-167 are not dependent on how each of IEDs 161-167 is connected to communication switch 110. Rather, communication switch 110 may be configured to translate between numerous types of physical network ports and provide the associated protocol conversions.

According to various embodiments, communication switch 110 may be configured to create and/or manage the communication relationships between networked IEDs 161-167. For example, communication switch 110 may allow a group of IEDs to communicate with one another as if the IEDs were connected in a tree structure, in master/slave relationships, in publisher/subscriber relationships, and the like.

FIG. 2A illustrates an embodiment of a system 200 that includes several IEDs 261-265 connected as a group 260, and a communication switch 210. As illustrated, IEDs 261 and 262 are connected via Ethernet and IEDs 263-265 are connected via D-subminiature serial connections. Communication switch 210 may be configured to manage group 260 in a publisher/subscriber configuration. That is, one or more IEDs within group 260 may be configured to subscribe to the transmission of other IEDs within group 260. Accordingly, communication switch 210 may maintain a database associating each IED in group 260 with a list of other IEDs within group 260 that subscribe to that IED's transmissions. When a given IED transmits data, communication switch 210 may determine which IEDs subscribe to the given IED and may forward the transmitted data to each of the subscriber IEDs. Communication switch 210 may perform the appropriate protocol conversion and media translation.

As a specific example, IED 262 may be connected to communication switch 210 via Ethernet ports 270 and may utilize IP to transmit data. IEDs 261 and 264 may subscribe to data "published" by IED 262. Accordingly, when communication switch 210 receives data from IED 262, the data will be forwarded to IED 261 and IED 264. Assuming IED 261 utilizes IP over Ethernet, the data transmitted by IED 262 may be forwarded unmodified. In the case of IED 264, communication switch 210 may convert the data to comply with the RS-232 standard and perform a medium translation to the D-subminiature connection 280. Ultimately, both subscriber IEDs 261 and 264 receive the data published by publisher IED 262. According to various embodiments, no individual IED may be aware that other IEDs within group 260 are connected via disparate interfaces since communication switch 210 performs the appropriate protocol conversion and media translation. IED 265 may subscribe to data published by each of IEDs 261-264. IED 265 may be configured to subscribe and "listen" to data published by IEDs 261-264 and report to an operator or IED outside of group 260.

According to one embodiment, publisher/subscriber relationships may be managed via logic. For example, one or more IEDs may subscribe to a primary publisher so long as a contact input is not asserted. In the event that the primary publisher fails, the contact input may assert and cause the one or more IEDs to stop subscribing to the primary publisher and instead subscribe to the backup publisher. Publisher/subscriber relationships between various IEDs may be automatically controlled based on any number of logic inputs and logic circuits via software, firmware, and/or hardware.

According to one embodiment, IED 263 may be configured to function as a master device, with each of IEDs 261, 262, 264, and 265 functioning as slave devices. According to various embodiments, master IED 263 may provide proxy and/or authentication services to slave IEDs within group 260. Accordingly, access to slave IEDs within group 260 may be restricted and/or controlled by master IED 263. According to an alternative embodiment, master IED 263 may function as a master device only as viewed from outside of group 260. That is, master IED 263 may restrict access and/or authenticate IEDs and/or operators outside of group 260.

Additionally, communication switch 210 may allow IEDs within group 260 to communicate with one another as if they were connected in a multidrop communication bus, in series, in parallel, as a tree structure with assigned nodes, in a star configuration, or in another network arrangement. In other words, while each of IEDs 261-265 may be directly connected to communication switch 210, communication switch 210 may enable the IEDs in group 260 to communicate as if they were connected according to any of a wide variety of network arrangements.

FIG. 2B illustrates a representative embodiment of a group of IEDs 261-265 effectively configured in a multidrop network. As illustrated, IED 263 may serve as a master device and as the initial connection point to the multidrop network. Of course, the actual physical connections of IEDs 261-265 to a communication switch may resemble that of FIG. 2A. FIG. 2B is intended to illustrate an example of one possible effective relationship between each of the IEDs in group 260 of FIG. 2A.

FIG. 2C illustrates a representative embodiment of a group of IEDs 261-265 effectively configured in a master/slave star configuration. As illustrated, any data transmitted from one IED to another passes through master IED 263. Again, given that each IED is actually directly connected to communication switch 210, data could be transmitted directly from one IED to another. However, FIGS. 2B and 2C illustrate examples of a communication switch providing configurable relationships between multiple IEDs, even when the network interfaces of each IED may differ significantly.

FIG. 3 illustrates an embodiment 300 of a communication switch 310 and a plurality of IEDs 320-325 and 330-334 configured to function as two distinct groups of IEDs. Specifically, group 327 comprises IEDs 320, 321, 322, 323, 324, and 325, and group 337 comprises IEDs 330, 331, 332, 333, and 334. As illustrated, IEDs 320, 321, and 332 may be connected to communication switch 310 via Ethernet ports 370 and may utilize IP. IEDs 322-325 and IEDs 330, 331, 333, and 334 may be connected to communication switch 310 via serial D-subminiature ports 380. According to various alternative embodiments, any of the IEDs in group 327 or group 337 may be connected using a coaxial connection, any variety of a D-subminiature port, an optical port, a wireless network interface, or other serial or parallel network connection. Furthermore, one or more IEDs may be connected to communication switch 310 through a router, hub, switch, or other IED.

According to various embodiments, communication switch 310 may create and/or manage any number of groups of IEDs. Each group may include IEDs configured with specific relationships with respect to one another. Additionally, communication switch 310 may create and/or manage the relationships between various groups. For example, communication switch 310 may manage the authentication and security of data transferred between IEDs in group 327 and IEDs in group 337.

IEDs 320-325 in group 327 may be configured in publisher/subscriber relationships, while IEDs 330-334 in group 337 may be configured in a star configuration with IED 333 as a master device. Alternatively, communication switch 310 may create and/or manage any type of relationship between any of the IEDs within group 327 and group 337. Communication switch 310 is not limited to supporting merely Ethernet and D-subminiature ports. Rather, communication switch 310 may provide protocol conversion and media translation to accommodate for any number of disparate network interfaces and associated protocols.

Figure 4:
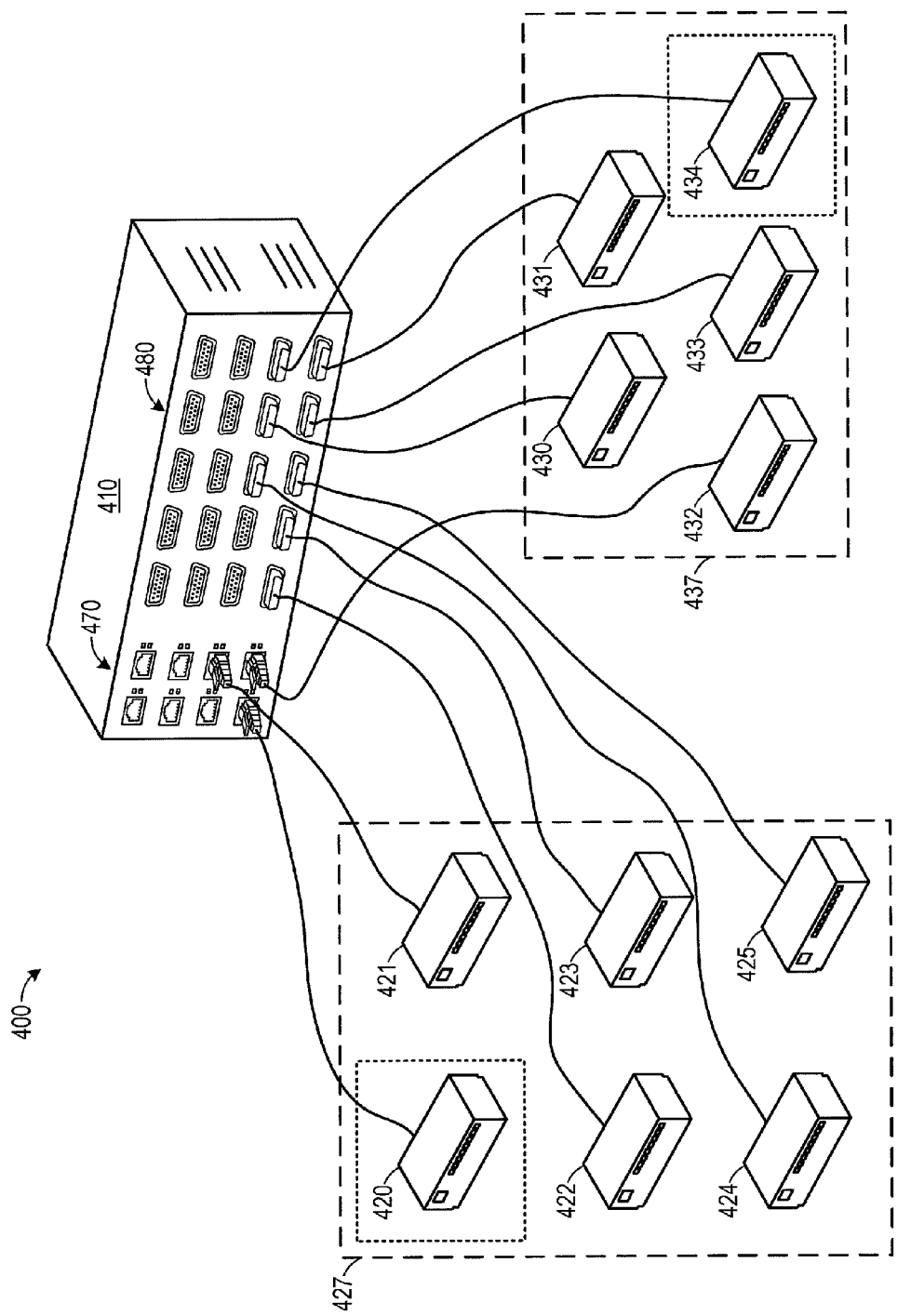
FIG. 4 illustrates an embodiment of a communication switch and a plurality of IEDs configured in two distinct groups, each group including a master device and slave devices.

FIG. 4 illustrates an embodiment 400 of a communication switch 410 and a plurality of IEDs 420-425 and 430-434 configured to function as two distinct groups of IEDs, each group including a master device and slave devices. As illustrated, IED 420 may be configured to function as a master device for group 427, while IEDs 421, 422, 423, 424, and 425 are configured to function as slave devices relative to IED 420. Similarly, IED 434 may be configured to function as a master device for group 437. Group 437 may include IEDs 430, 431, 432, and 433 configured to function as slave devices relative to IED 434. It is of note that the type of connection and/or the protocol an IED uses to communicate with communication switch 410 is not determinative of its role within a group.

In group 427 master IED 420, is connected via an Ethernet port 470 and may use IP to transmit data. At least one slave device, IED 421, is connected via an Ethernet port 470. The remaining slave devices, IEDs 422-425, are connected via D-subminiature serial ports 480. Contrarily, in group 437, master IED 434, is connected via a D-subminiature port 480. As previously discussed, master IEDs 420 and 434 may provide proxy and authentication services to other IEDs within their respective groups 427 and 437.

Figure 5:
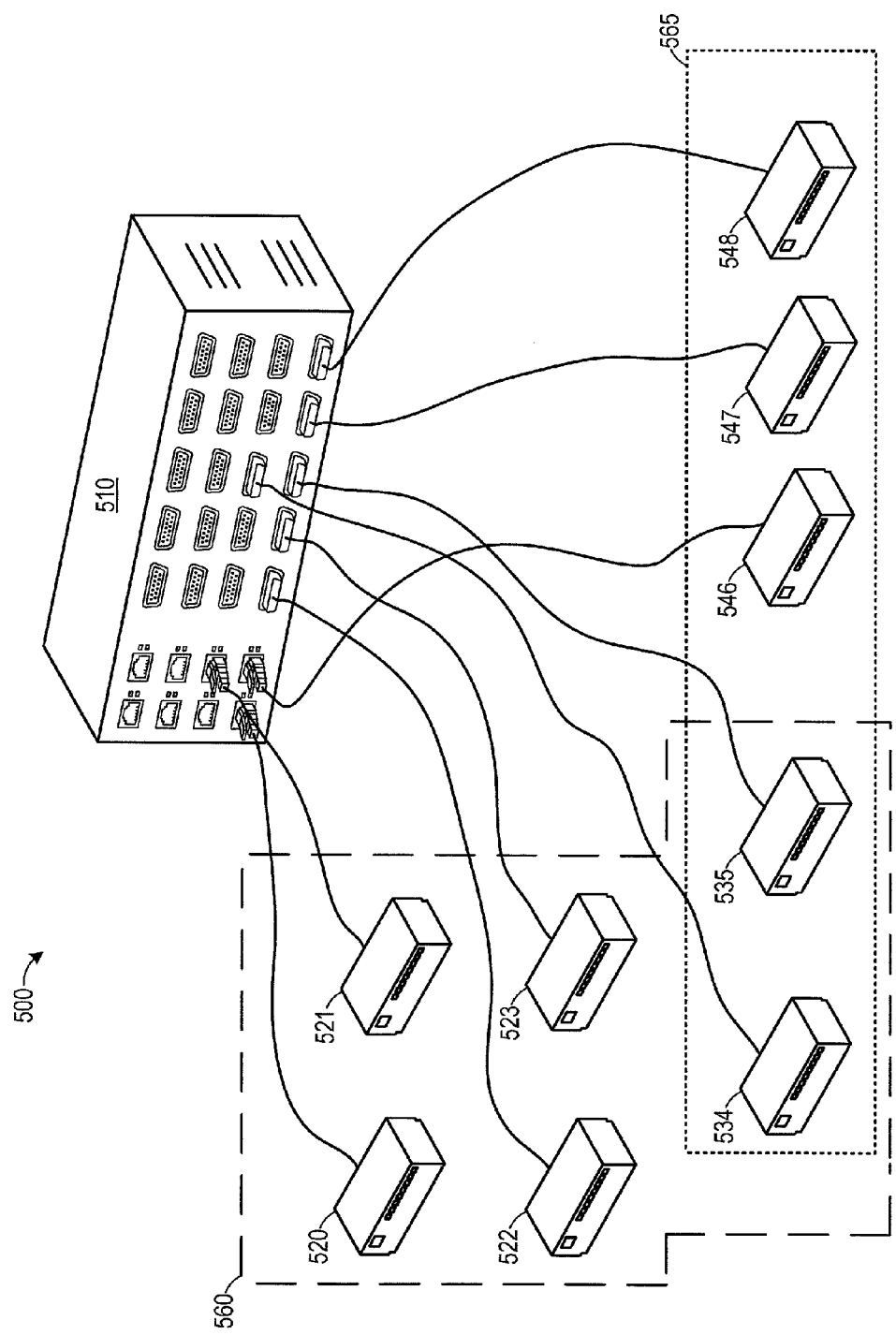
FIG. 5 illustrates an embodiment of a communication switch and a plurality of IEDs configured as two groups of IEDs, in which some IEDs are included in both groups.

FIG. 5 illustrates an embodiment of a system 500 including a communication switch 510 and a plurality of IEDs 520, 521, 522, 523, 534, 535, 546, 547, and 548 that are configured to function as two groups 560 and 565. According to various embodiments, each communication port of an IED may be a part of a different group. Accordingly, an IED with two or more communication ports may be a part of two or more groups. According to some embodiments, a communication port of an IED may be shared between two distinct groups. For example, an Ethernet port may allow an IED to connect to two distinct groups with or without the two distinct groups necessarily being aware that the IED is part of another group.

As illustrated, IEDs 534 and 535 are included in both group 560 and group 565. Again, communication switch 510 may create and/or manage complex relationships between any number of IEDs, independent of the network interface type and/or communication protocol used. As previously stated, a communication switch, such as communication switch 510, may provide protocol conversion and media translation as appropriate in order to enable each IED connected to the communication switch to communicate with other networked IEDs.

In the illustrated embodiment 500, group 560, comprising IEDs 520-523, 534, and 535, may be configured in a publisher/subscriber relationship. Each IED in group 560 may be configured to subscribe to the communications published by one or more other IEDs within group 560. For example, IED 535 may subscribe to the communications of each other IED within group 560. IED 523 may subscribe to only the communications of IED 534. IED 534 may not subscribe to any IED within group 560 or group 565, and thus may function exclusively as a publisher.

IEDs within group 565 may also be configured in publisher/subscriber relationships. Again, communication switch 510 may maintain a database indicating which other IEDs in group 565 subscribe to the communications of a particular IED. Accordingly, when IED 535 transmits (publishes) data to communication switch 510, communication switch 510 may determine which IEDs in group 560 and in group 565 subscribe to IED 535. Communication switch 510 may then perform the appropriate protocol conversion and media translation in order for each subscriber IED to receive the data published by IED 535.

Although each of the IEDs in groups 560 and 565 is directly connected to communication switch 510, communication switch 510 may allow for any of a variety of effective network configurations. For example, IEDs within a given group may communicate as if they were connected in a multidrop configuration, in a tree structure, in parallel, or in another configuration.

Figure 6:
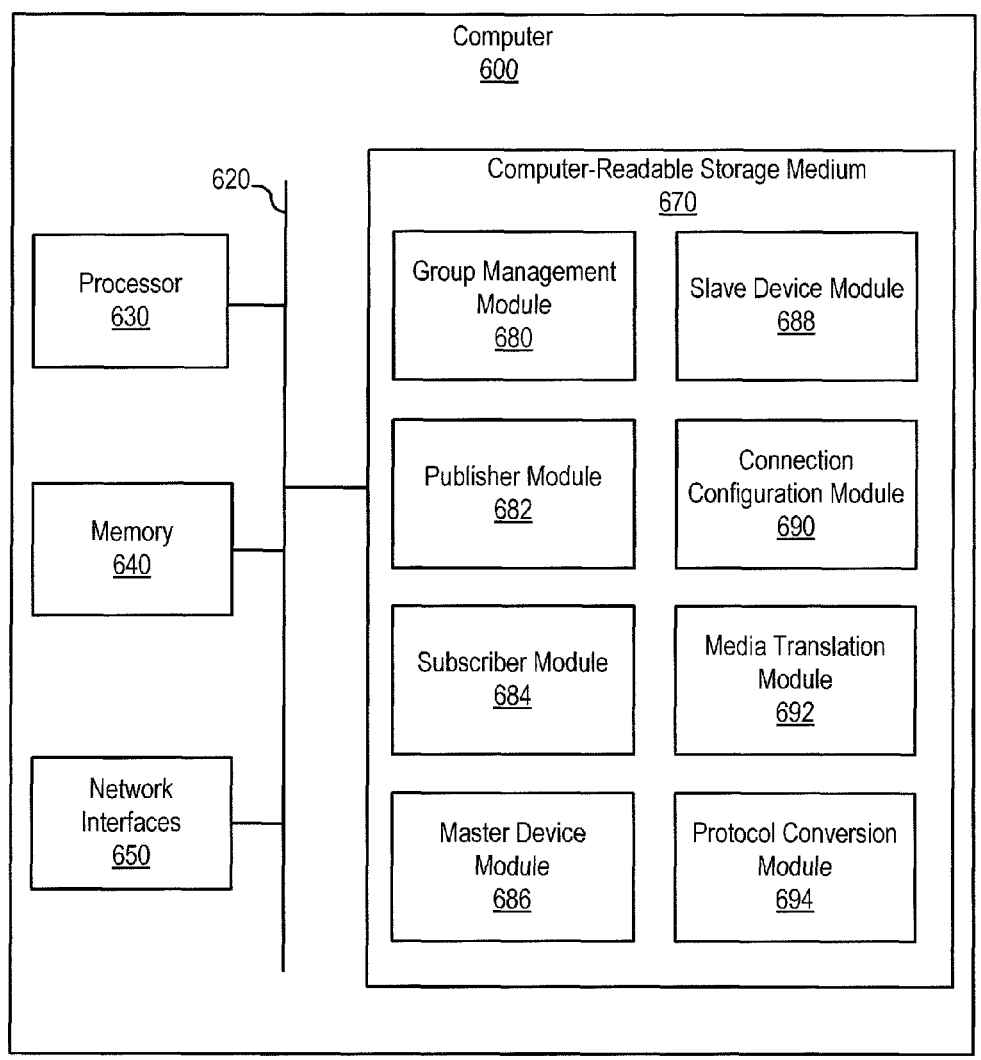
FIG. 6 illustrates an embodiment of a functional block diagram of a computer system configured to connect and manage groups of IEDs connected via disparate network interfaces.

FIG. 6 illustrates an embodiment of a functional block diagram of a computer system 600 configured to create and/or manage groups of IEDs connected via disparate network interfaces. As illustrated, a computer may include a processor 630, memory (RAM) 640, various network interfaces 650, and a computer-readable storage medium 670, all connected via a bus 620.

Processor 630 may be configured to process communications received via network interfaces 650. Processor 630 may operate using any number of processing rates and architectures. Processor 630 may be configured to perform various algorithms and calculations described herein. Processor 630 may be embodied as a general-purpose integrated circuit, an application-specific integrated circuit, a field-programmable gate array, and/or other programmable logic devices.

Network interfaces 650 may allow for communication between computer system 600 and a plurality of connected IEDs and operator access devices. Network interfaces 650 may be embodied using a variety of interfaces for various types of physical media (e.g., optical fiber, twisted pair, coaxial cable). Further, network interfaces 650 may be configured to allow communication according to a variety of communications protocols and speeds. According to various embodiments, multiple network interfaces may be utilized in order to allow for communication with multiple IEDs or other network components.

According to various embodiments, network interfaces 650 may comprise a variety of physical network ports that may be configured to communicate using a variety of communication protocols. For example, any of a variety of serial or parallel network ports may be used, including Ethernet ports, coaxial connections, various types of D-subminiature ports, optical ports, USB ports, IEEE 1394 ports, wireless network interfaces, and the like.

Computer-readable storage medium 670 may include a plurality of software modules that are executable on processor 630 and that are configured to perform specific tasks and/or methods described herein. According to various embodiments, one or more software modules may be combined to form a multifunctional module or separated into a plurality of modules. Moreover, a software module, or a portion thereof, may be alternatively implemented as firmware and/or hardware.

As illustrated, computer-readable storage medium 670 may include a group management module 680, a publisher module 682, a subscriber module 684, a master device module 686, a slave device module 688, a connection configuration module 690, a media translation module 692, and/or a protocol conversion module 694. According to some embodiments, one or more modules may be excluded or implemented in hardware.

According to various embodiments, group management module 680 may be configured to create a group of IEDs. The group of IEDs may comprise any number of IEDs, each of which may be connected via disparate network interfaces 650. Additionally, the group of IEDs may utilize a variety of disparate communication protocols associated with the various network interfaces.

Publisher module 682 may be configured to manage IEDs within a group of IEDs that are configured to publish communications to at least one other IED within the group of IEDs. Subscriber module 684 may be configured to manage IEDs within a group of IEDs that are configured to subscribe to other IEDs within the group of IEDs. Publisher module 682 and subscriber module 684 jointly configure IEDs to function in publisher/subscriber relationships. As previously described, a communication switch may enable IEDs to subscribe to publisher IEDs that utilize disparate network interfaces and communication protocols.

According to various embodiments, all IEDs in a group may be publishers by default. IEDs within the group may then be configured as subscribers to one or more other IEDs within the group. According to such an embodiment, no IEDs in a group are affirmatively prevented from publishing. Rather, if no other IEDs within a group are configured to subscribe to a particular IED, then the unsubscribed-to IED is effectively a sniffer device.

Master device module 686 and slave device module 688 may jointly configure devices within a group of IEDs as master devices or slave devices. Accordingly, a group of IEDs may include one or more IEDs configured to serve as master devices with respect to one or more slave devices. According to various embodiments, master device module 686 may manage an IED such that it effectively functions as a master device within a group of IEDs, even if the IED by itself does not support the necessary functions. Similarly, slave device module 688 may manage an IED such that it effectively functions as a slave device relative to a master device within a group of IEDs.

Connection configuration module 690 may be configured to enable each of the IEDs within a group to communicate with one another as if they were connected according to one of a variety of network configurations. For example, IEDs within a group may be configured to communicate as if they were configured in a multidrop network configuration. Alternatively, connection configuration module 690 may enable IEDs within a group to communicate with one another as if they were connected in a star configuration.

Media translation module 692 and protocol conversion module 694 may ensure that data transmitted to a communication switch via a first type of network interface and associated communication protocol can be forwarded to other IEDs utilizing different network interfaces and/or alternative communication protocols. For example, media translation module 692 may translate data transmitted via Ethernet to another medium such as a 9-pin or 25-pin D-subminiature connection or an optical Ethernet connection. Protocol conversion module 694 may convert data transmitted using IP to another communication protocol, such as RS-232 or RS-485.

Figure 7:
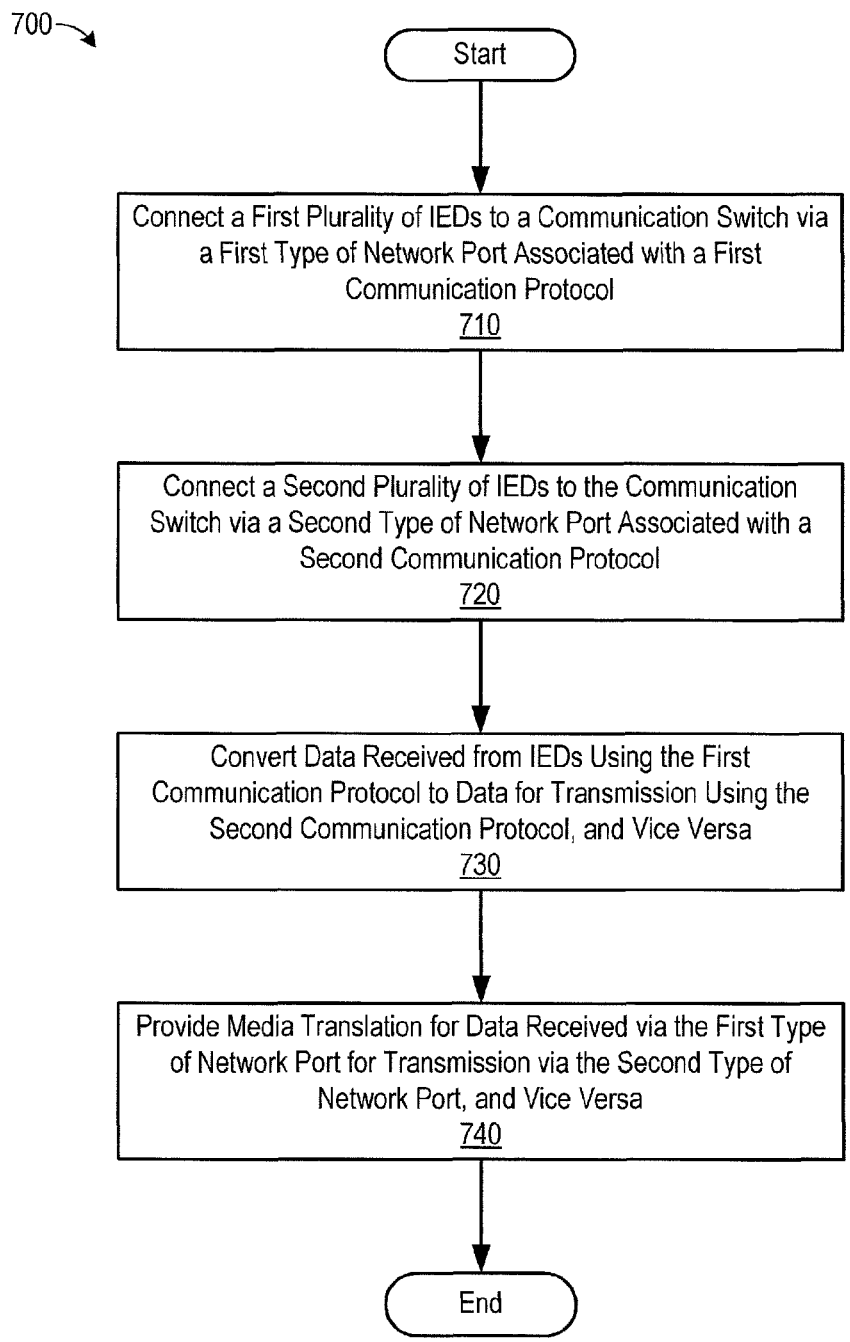
FIG. 7 illustrates an embodiment of a method for providing configurable network relationships between a plurality of IEDs connected via disparate network interfaces.

FIG. 7 illustrates one embodiment of a method 700 for providing configurable network relationships between each of a plurality IEDs connected to a communication switch via disparate network interfaces. Each of a first plurality of IEDs may be connected to a communication switch via a first type of network port (e.g., Ethernet) associated with a first communication protocol (e.g., IP), at 710. Each of a second plurality of IEDs may be connected to a communication switch via a second type of network port (e.g., a 9-pin D-subminiature connection) associated with a second communication protocol (e.g., RS-232), at 720.

According to various embodiments, a communication switch may convert data received from an IED using the first communication protocol to data for transmission using the second communication protocol, at 730. Similarly, the communication switch may convert data received from an IED using the second communication protocol to data for transmission using the first communication protocol, at 730. Additionally, a communication switch may be configured to translate data received via the first type of network port for transmission via the second type of network port, at 740. The communication switch may also translate data received via the second type of network port for transmission via the first type of network port, at 740.

Figure 8A:
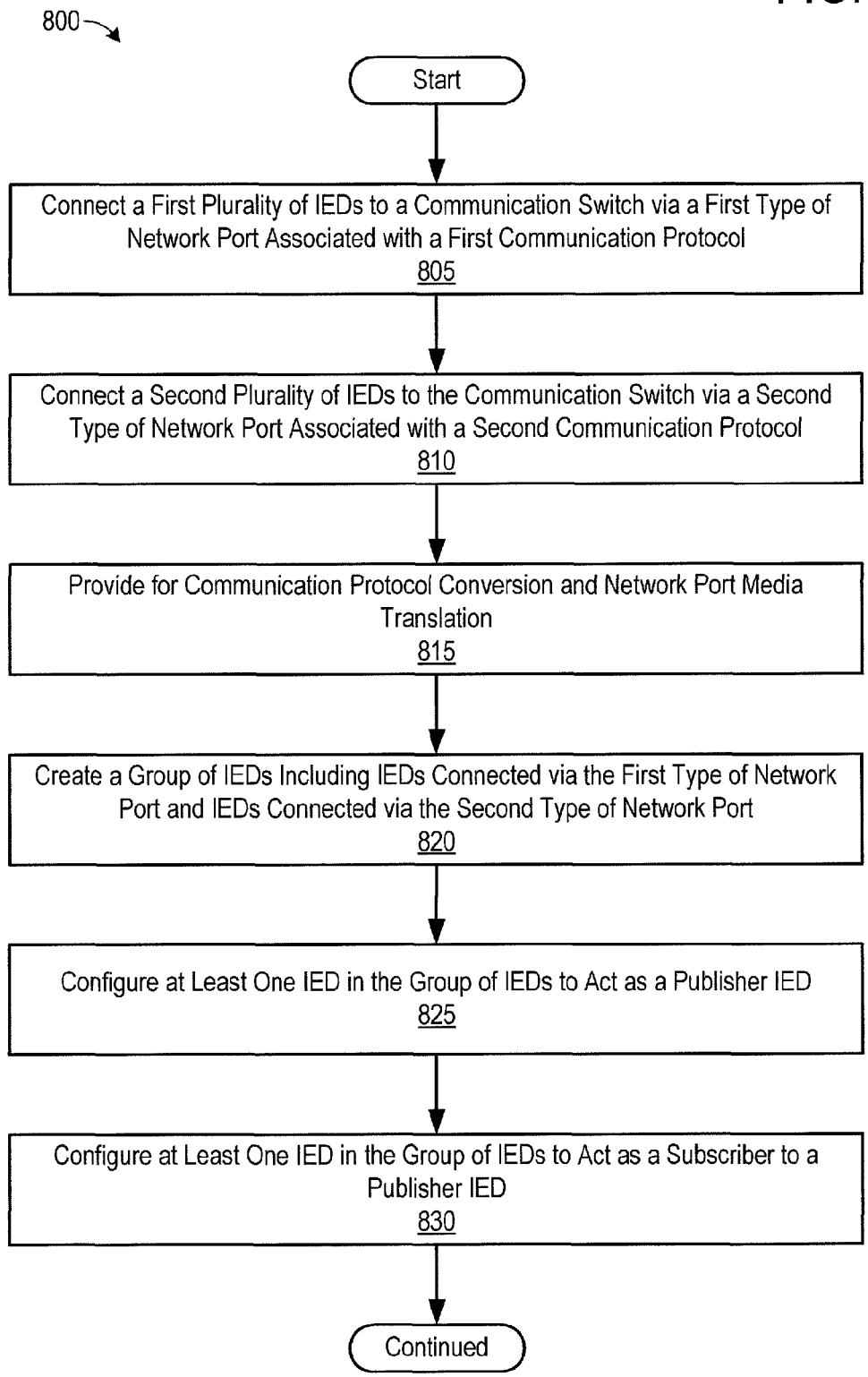
FIG. 8A illustrates an embodiment of a method for configuring a plurality of IEDs connected via disparate network interfaces to function in a publisher/subscriber network paradigm.

FIG. 8A illustrates one embodiment of a method 800 for configuring a plurality of IEDs connected via disparate network interfaces to function in a publisher/subscriber network paradigm. Each of a first plurality of IEDs is connected to a communication switch via a first type of network port associated with a first communication protocol, at 805. Each of a second plurality of IEDs is connected to the communication switch via a second type of network port associated with a second communication protocol, at 810. As described in detail above, the communication switch may provide for communication protocol conversion and network port media translation, at 815.

The communication switch creates a group of IEDs, including IEDs connected via the first type of network port and IEDs connected via the second type of network port, at 820. At least one IED in the group of IEDs is configured to act as a publisher IED, at 825. Additionally, at least one IED in the group of IEDs is configured to act as a subscriber to a publisher IED, at 830. According to some embodiments, all IEDs in a group of IEDs are configured to act as publisher IEDs by default. Accordingly, each IED within the group may be user-configured with regard to which other IEDs it subscribes but not as to whether it is a publisher or not.

For example, a group of five IEDs may include multiple IEDs that publish information by transmitting data to the communication switch. When an IED transmits data to the communication switch, the communication switch may determine which IEDs in the group of IEDs subscribe to the transmitting IED and forward the data to each of the subscriber IEDs. According to various embodiments, in order to forward the data to a given subscriber IED, the communication switch may perform the appropriate protocol conversion and media translation.

Figure 8B:
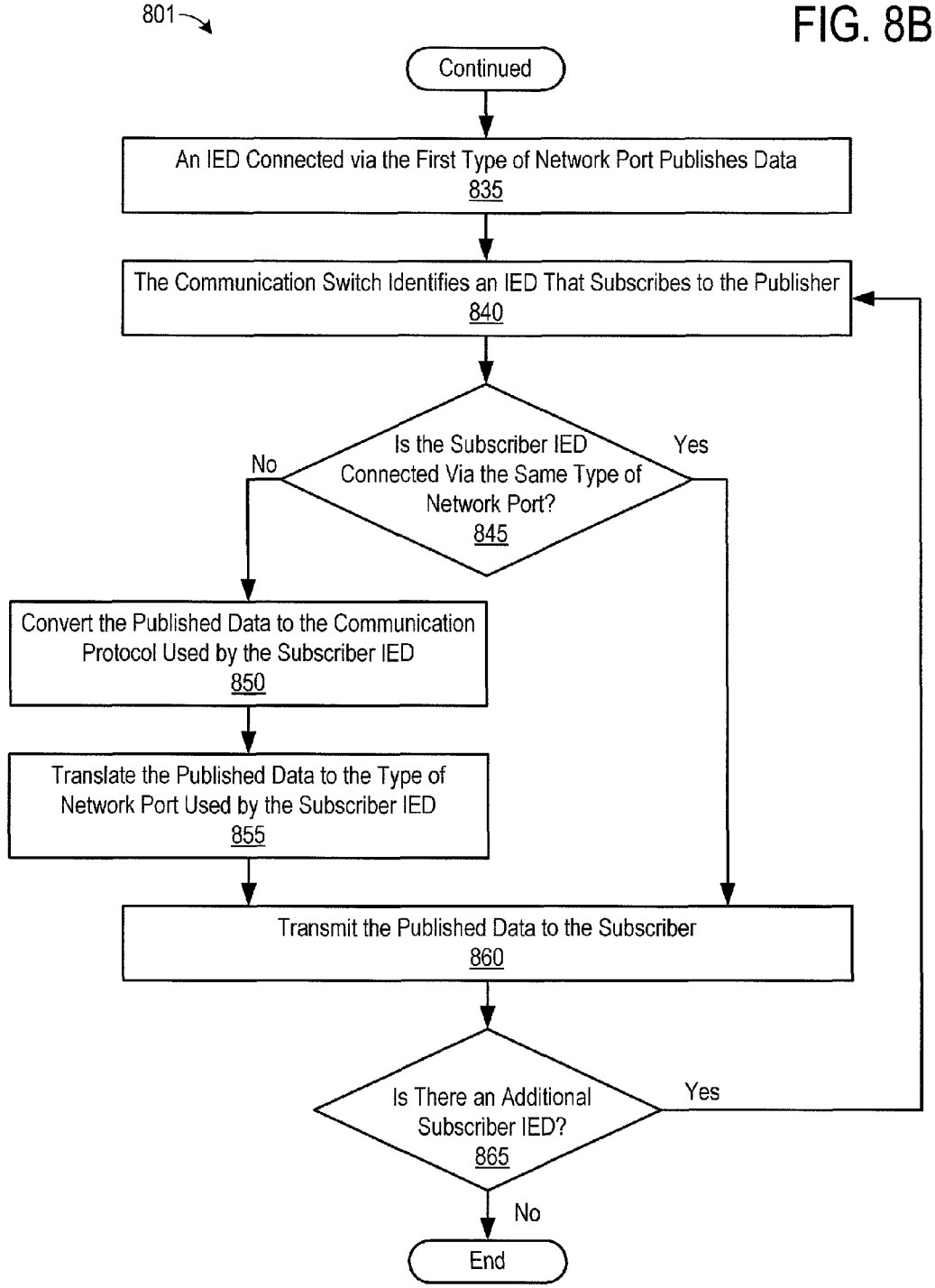
FIG. 8B illustrates an embodiment of a method for providing communication protocol conversion and network interface translation for a group of IEDs configured in a publisher/subscriber network paradigm.

FIG. 8B illustrates an embodiment of a method 801 for providing such communication protocol conversion and network port media translation for a group of IEDs in a publisher/subscriber network. A publisher IED connected via the first type of network port publishes data, at 835. The communication switch identifies an IED within the group that subscribes to the publisher IED, at 840. The communication switch determines if the subscriber IED is connected via the same type of network port, at 845. If so, the communication switch may transmit the publisher data directly to the subscriber IED, at 860. If the subscriber IED is not connected via the same type of network port, at 845, then the published data may be converted to the communication protocol used by the subscriber IED, at 850. The published data may also be translated to the type of network port used by the subscriber IED, at 855. The converted and translated published data may then be transmitted to the subscriber IED, at 860. The communication switch may then determine if there is an additional IED that subscribes to the publisher IED, at 865. If so, the process continues at 840. Once each subscriber IED has received the published data, at 865, the process ends.

According to various embodiments, subscriber IEDs may receive published data through parallel processing of data to various subscriber IEDs. Additionally, even if a subscriber IED is connected via the same type of network port, at 845, the communication switch may provide an appropriate protocol conversion when it is beneficial or necessary.

Figure 9:
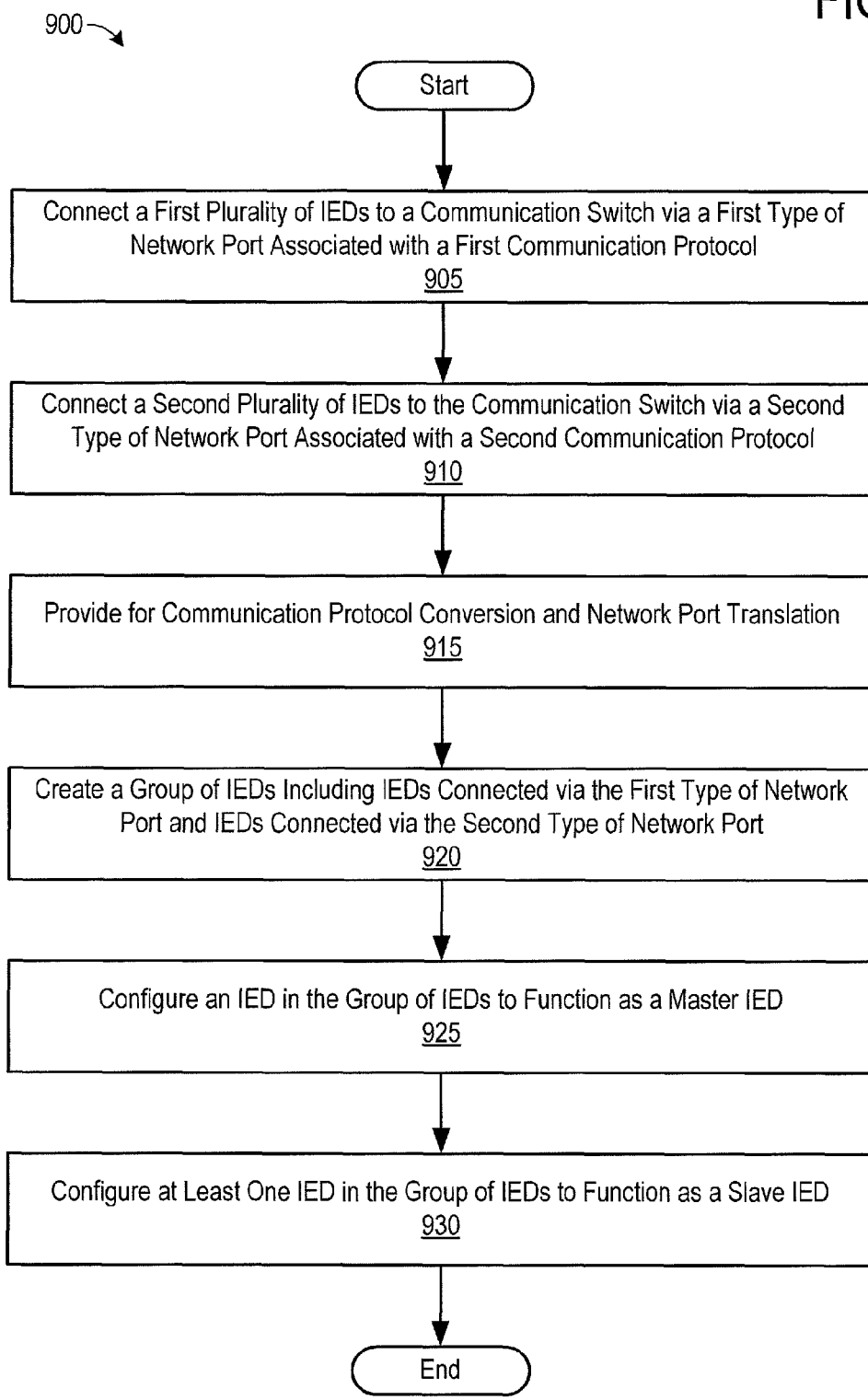
FIG. 9 illustrates one embodiment of a method for providing a configurable master/slave network relationship between a plurality of IEDs connected via disparate network interfaces.

FIG. 9 illustrates one embodiment of a method 900 for providing a configurable master/slave network relationship between a plurality of IEDs connected via disparate network interfaces. Each of a first plurality of IEDs may be connected to a communication switch via a first type of network port associated with a first communication protocol, at 905. Each of a second plurality of IEDs may be connected to the communication switch via a second type of network port associated with a second communication protocol, at 910.

As appropriate, the communication switch may provide protocol conversion and network port media translation in order for the various IEDs to communicate with one another, at 915. A group of IEDs is created, including IEDs connected via the first type of network port and IEDs connected via the second type of network port, at 920. One of the IEDs in the group of IEDs is configured to function as a master IED, at 925. At least one other IED in the group of IEDs is configured to function as a slave IED, at 930.

According to various embodiments, the master IED may provide proxy and/or authentication services to slave IEDs within the group. Accordingly, access to the slave IEDs may be restricted and/or controlled by the master IED. Moreover, communication between the various IEDs in the group may be configured according to any one of a variety of network structures, including a tree, a star configuration with the master IED at the center, a multidrop network, or another arrangement.

The above description provides numerous specific details for a thorough understanding of the embodiments described herein. However, those of skill in the art will recognize that one or more of the specific details may be omitted, modified, and/or replaced by a similar process or system.

What is claimed:

1. A method for providing configurable switching between a plurality of intelligent electronic devices (IEDs) comprising:

connecting a first plurality of IEDs to a communication switch via a first type of physical network port associated with a first communication protocol;

connecting a second plurality of IEDs to the communication switch via a second type of physical network port associated with a second communication protocol;

creating a group of IEDs comprising at least one IED from the first plurality of IEDs and at least one IED from the second plurality of IEDs;

configuring at least one IED within the group of IEDs as a publisher IED configured to publish communications;

configuring at least one IED within the group of IEDs as a subscriber IED to subscribe to communications transmitted by the publisher IED; and enabling IEDs connected via the first type of network port to communicate with IEDs connected via the second type of network port in a multidrop configuration by:

the communication switch determining whether the publisher IED and the subscriber IED are connected using different types of network ports;

when the publisher IED and the subscriber IED are connected using the same type of network ports, the communication switch transmitting communications between the plurality of IEDs; and when the publisher IED and the subscriber IED are connected using different types of network ports:

in a data conversion step, the communication switch converting data transmissions between the first communication protocol and the second communication protocol; and in a physical translation step, the communication switch translating data transmissions between the first type of physical network port and the second type of physical network port.

2. The method of claim 1, further comprising:

connecting a third plurality of IEDs to the communication switch via a third type of physical network port using a third communication protocol; and enabling IEDs connected via the third type of network port to communicate with IEDs connected via the first and second types of network ports by:
converting data transmissions between the third communication protocol and the first and second communication protocols; and
translating data transmissions between the third type of physical network port and the first and second types of physical network ports.

3. The method of claim 1, wherein the first type of physical network port comprises an Ethernet port and the second type of physical network port comprises a D-subminiature port.

4. The method of claim 1, further comprising:
creating a group of IEDs comprising at least one IED from the first plurality of IEDs and at least one IED from the second plurality of IEDs;
configuring one of the IEDs in the group of IEDs to function as a master device; and
configuring at least one other IED in the group of IEDs to function as a slave device.

5. The method of claim 4, wherein the IED configured to function as the master device provides proxy services to each slave device within the group of IEDs.

6. The method of claim 4, wherein at least two IEDs in the group of IEDs are configured to function as slave devices; and further comprising:
enabling the slave devices to communicate in a star configuration with respect to the IED configured to function as the master device.

7. A communication switch comprising:
a processor;
a plurality of physical network ports of a first type configured to allow for the connection of a first plurality of intelligent electronic devices (IEDs);
a plurality of physical network ports of a second type configured to allow for the connection of a second plurality of IEDs;
a media translation module configured to translate between the first type of physical network port and the second type of physical network port;
a protocol conversion module configured to convert between a first communication protocol associated with the first type of physical network port and a second communication protocol associated with the second type of physical network port;
a group management module configured to create a group of IEDs comprising at least one IED connected to the communication switch via a physical network port of the first type and at least one IED connected to the communication switch via a physical network port of the second type;
a publisher module configured to manage at least one IED within the group of IEDs configured to publish communications to at least one other IED within the group of IEDs; and,
a subscriber module configured to manage at least one IED within the group of IEDs configured to subscribe to communications from at least one other IED within the group of IEDs; and
a connection configuration module configured to enable each of the IEDs within the group of IEDs to communicate with one another as if the IEDs were connected in a multidrop communication bus;
wherein the processor is configured to enable IEDs connected via the plurality of physical network ports of the first type to communicate with the IEDs connected via the plurality of physical network ports of the second type by:
the communication switch determining whether the plurality of IEDs are connected using different types of physical network ports;
when the plurality of IEDs are connected using the same type of network ports, the communication switch transmitting communications between the plurality of IEDs; and
when the plurality of IEDs are connected using different types of network ports:
the media translation module translating between the first type of physical network port and the second type of physical network port; and,
the protocol conversion module converting data transmissions between the first communication protocol and the second communication protocol.

8. The communication switch of claim 7, further comprising:
a computer-readable storage medium in communication with the processor; and
wherein the media translation module and the protocol conversion module are implemented as software modules within the computer-readable storage medium.

9. The communication switch of claim 7, further comprising a third plurality of physical network ports of a third type configured to allow for the connection of a third plurality of IEDs:
wherein the media translation module is further configured to convert between the third type of physical network port and the first and second types of physical network ports; and
wherein the protocol conversion module is further configured to convert between a communication protocol associated with the third type of physical network port and the first and second communication protocols associated with the first and second types of physical network ports.

10. The communication switch of claim 7, wherein the first type of physical network port comprises an Ethernet port and the second type of physical network port comprises a D-subminiature port.

11. The communication switch of claim 7, further comprising:
a computer-readable storage medium in communication with the processor, comprising:
a group management module configured to create a group of IEDs comprising at least one IED connected to the communication switch via a physical network port of the first type and at least one IED connected to the communication switch via a physical network port of the second type;
a master device module configured to manage an IED within the group of IEDs configured to function as a master device within the group of IEDs; and
a slave device module configured to manage at least one IED within the group of IEDs configured to function as a slave device within the group of IEDs.

12. The communication switch of claim 11, wherein the IED functioning as the master device provides proxy services to each slave device within the group of IEDs.

13. The communication switch of claim 11, wherein the slave device module is configured to manage at least two IEDs configured to function as slave devices within the group of IEDs; and
wherein the computer-readable storage medium further comprises a connection configuration module configured to enable the slave devices to communicate with one another as if they were connected in a star configuration with respect to the IED configured to function as the master device.

14. The communication switch of claim 7, wherein one of the plurality of physical network ports of the first type comprises an access device port.

15. The communication switch of claim 7, wherein one of the plurality of physical network ports of the second type comprises an access device port.

16. A method for providing configurable switching between a plurality of intelligent electronic devices (IEDs) comprising:
connecting a first plurality of IEDs to a communication switch via a first type of physical network port associated with a first communication protocol;
connecting a second plurality of IEDs to the communication switch via a second type of physical network port associated with a second communication protocol;
creating a plurality of groups of IEDs in a database of the communication switch, each group comprising IEDs from the first plurality of IEDs and IEDs from the second plurality of IEDs; and
the communication switch enabling IEDs within each group of the plurality of groups connected via the first type of network port to communicate with IEDs within the same group connected via the second type of network port in a multidrop configuration by:
configuring at least one IED within a group as a publisher IED to publish communications;
configuring at least one IED within the group as a subscriber IED to subscribe to communications transmitted by the publisher IED;
determining whether the publisher and subscriber IEDs are connected using the same type of network ports;
when the publisher and subscriber IEDs are connected using the same type of network ports, the communication switch transmitting communication between the publisher and subscriber IEDs; and,
when the publisher and subscriber IEDs are connected using different types of network ports:
in a data conversion step, the communication switch converting data transmissions between the first communication protocol and the second communication protocol; and
in a physical translation step, the communication switch translating data transmissions between the first type of physical network port and the second type of physical network port.

* * * * *